Patented Feb. 20, 1934

1,947,943

UNITED STATES PATENT OFFICE 1,947,943

PROCESS OF PREPARING CONDENSATION PRODUCTS OF THE BENZANTHRONE SERIES AND NEW PRODUCTS OBTAINABLE THEREBY

Georg Kraenzlein, Frankfort-on-the-Main-Hochst, and Martin Corell, Frankfort-on-the-Main, Germany, assignors to General Aniline Works, Inc., New York, N. Y., a corporation of Delaware No Drawing. Application January 27, 1930, Serial No. 423,893, and in Germany February 7, 1929

8 Claims. (Cl. 260—61)

The present invention relates to a new process of preparing condensation products of the benzanthrone series and to new products obtainable thereby.

We have found that condensation products of the benzanthrone series are obtainable by heating with aluminium chloride particularly sodium aluminium chloride a compound of the general formula:

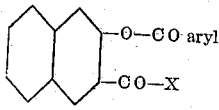

wherein X represents a hydroxyl- alkoxyl- or amino group. The process is preferably carried out at an elevated temperature as for instance between 100° C.–200° C. We prefer to use a temperature of about 140° C.–160° C. The new products obtainable according to our new process are mordant dyestuffs of excellent fastness properties crystallizing from glacial acetic acid and showing a fluorescence in a concentrated sulfuric acid solution.

The following examples illustrate the invention, but they are not intended to limit it thereto, the parts being by weight:

(1). 200 parts of benzoic acid ester of 2.3-hydroxynaphthoic acid are molten together with 2,000 parts of sodium aluminium chloride for 5-6 hours at a temperature between 140-150° C. After the molten mass has been decomposed and boiled out with dilute hydrochloric acid the crude acid is boiled again with a solution of dilute sodium carbonate, filtered and the 4-hydroxybenzanthrone-3-carboxylic acid is precipitated by means of hydrochloric acid. When recrystallized from glacial acetic acid the acid forms yellow needles and dissolves in concentrated sulfuric acid to an orange solution having a weakly brown fluorescence and a melting point of 285° C. The 4-hydroxybenzanthrone-3-carboxylic acid thus obtained is an excellent dyestuff capable of being chromed. It is particularly suitable for dyeing wool and it has very good properties to fulling, potting and light.

(2). 100 parts of benzoic acid ester of 2.3-hydroxynaphthoic acid ethylester, -melting point 98° C., prepared by benzoylation of 2.3-hydroxynaphthoic acid ethyl ester according to Schotten-Baumann,—are molten together with 1,000 parts of sodium aluminium chloride for 10 hours at 150° C.–160° C. After the decomposition of the molten mass and boiling out with dilute hydrochloric acid the crude acid is again boiled with a solution of dilute sodium carbonate, filtered and the 4-hydroxybenzanthrone-3-carboxylic acid is precipitated. It is identical with the acid described in Example 1.

(3). 100 parts of Bz-m-chloro-benzoic acid ester of 2.3-hydroxynaphthoic acid ethylester of the formula:

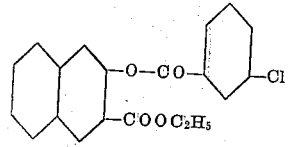

and melting at 112° C. are molten together with 1,100 parts of sodium aluminium chloride for about 10 hours at 150° C.–160° C. The molten mass is worked up as described in Example 1. The 4-hydroxy-6-chlorobenzanthrone-3-carboxylic acid obtained dissolves in concentrated sulfuric acid to an orange solution having a brown fluorescence and melting at 250° C.–252° C.

We claim:

1. The process which comprises heating with aluminium chloride a compound of the following general formula:

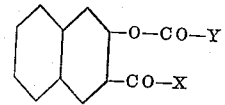

wherein X represents a hydroxyl-, alkoxyl- or amino group and Y represents an aryl of the benzene series.

2. The process which comprises heating with aluminium chloride at a temperature of about 100° C. to 200° C. a compound of the following general formula:

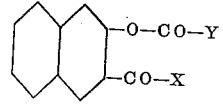

wherein X represents a hydroxyl-, alkoxyl- or amino group and Y represents an aryl of the benzene series.

3. The process which comprises heating with aluminium chloride at a temperature of about 140° C. to 160° C. a compound of the following general formula:

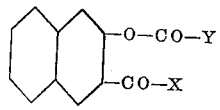

wherein X represents a hydroxyl-, alkoxyl- or amino group and Y represents an aryl of the benzene series.

4. The process which comprises melting with sodim aluminium chloride at a temperature of about 100° C. to 200° C. a compound of the following general formula:

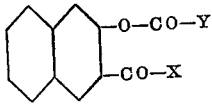

wherein X represents a hydroxyl-, alkoxyl- or amino group and Y represents an aryl of the benzene series.

5. The process which comprises melting with sodium aluminium chloride at a temperature of about 150° C. to 160° C. the benzoic acid ester of 2.3-naphthoic acid of the following formula:

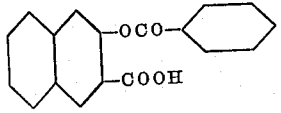

6. The compound of the following formula:

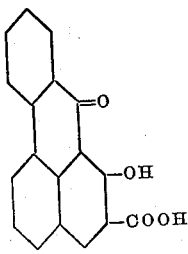

melting at 285° C. and crystallizing from glacial acetic acid in yellow needles.

7. The compound of the following formula:

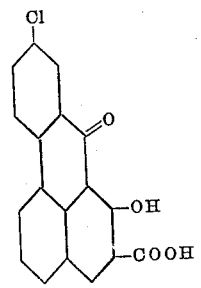

dissolving in concentrated sulfuric acid to an orange solution having a brown fluorescence and melting at 250° C.–252° C.

8. The compounds of the following formula:

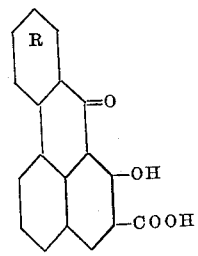

wherein the benzene nucleus R may contain a halogen atom as a substituent, crystallizing from glacial acetic acid and showing a fluorescence in a concentrated sulfuric acid solution.

GEORG KRAENZLEIN.
MARTIN CORELL.